A. W. SWANSON.
EXTENSIBLE GATE.
APPLICATION FILED MAY 2, 1918.
1,323,657. Patented Dec. 2, 1919.
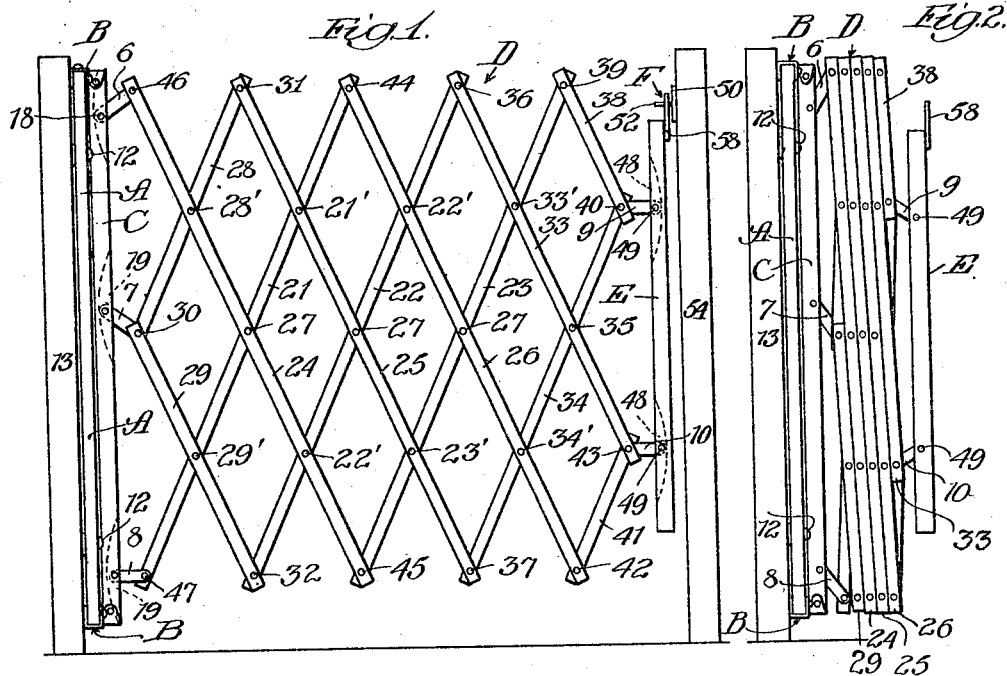
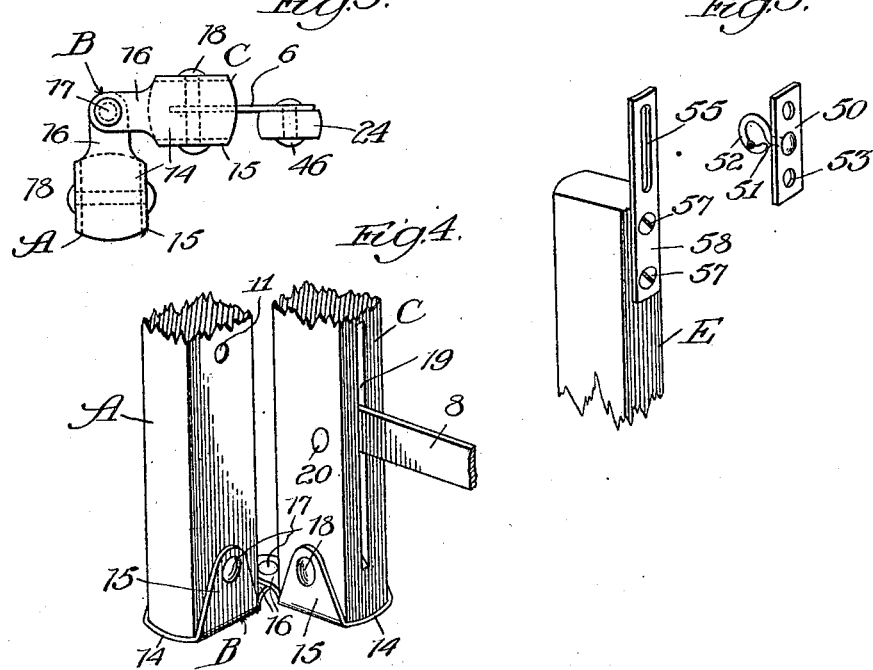
Witnesses:
Inventor:
Axel W. Swanson,

UNITED STATES PATENT OFFICE.

AXEL W. SWANSON, OF CHICAGO, ILLINOIS, ASSIGNOR TO THE HOLMQUIST-SWANSON COMPANY, OF CHICAGO, ILLINOIS, A CORPORATION OF ILLINOIS.

EXTENSIBLE GATE.

1,323,657.          Specification of Letters Patent.        Patented Dec. 2, 1919.

Application filed May 2, 1918. Serial No. 232,067.

*To all whom it may concern:*

Be it known that I, AXEL W. SWANSON, a citizen of the United States, residing at Chicago, in the county of Cook and State of Illinois, have invented a new and useful Improvement in Extensible Gates, of which the following is a specification.

This invention relates to an extensible gate; and it may be said to consist in the provision of the novel and advantageous features and the novel and improved construction, arrangement and combination of parts as will be apparent from the description and claims which follow hereinafter.

The object of the invention is to provide a novel and improved gate, which is comparatively simple in construction, economical to manufacture, neat in appearance, convenient and effective in use, and which can be compacted to occupy a relatively small space in a doorway or passageway. Thus, the device is peculiarly available for use as a porch-gate, as where small children are to be confined against straying from the porch.

Other objects and the advantages of the invention will be apparent to those skilled in the art from a consideration of the following description of the preferred construction, taken in connection with the accompanying drawings, in which—

Figure 1 is an elevational view showing the gate in extended condition in a doorway or passageway; Fig. 2 is an elevational view showing the gate in contracted condition; Fig. 3 is a plan view showing one of the hinges which connect the upright bars of the gate; Fig. 4 is a broken perspective view of a portion of the gate; and Fig. 5 shows perspective views of the locking parts for the gate.

As shown in the drawings, the gate comprises the upright bar A; the hinges B, which connect the upright bar C to the upright bar A; the extensible or lazy-tongs frame D which is connected by the links 6, 7 and 8, to the upright bar C; the upright end bar E which is connected by the links 9 and 10 to the extensible frame D; and the device F for locking the gate.

The upright bar A is provided with openings 11 for the screws 12 whereby said bar is fastened to the post or jamb 13 of the passageway or doorway. The hinges B each consist of a pair of horizontal leaves 14 which are provided with vertical flanges 15, and have horizontal extensions 16 which are joined by vertical pivots 17 passing through overlapping ends of said extensions 16. The horizontal leaves 14 are disposed on the upper and lower ends of the upright bars A and C and are held in place by the bolts or rivets 18 which pass through the vertical flanges 15 and through said upright bars.

The upright bar C is provided with longitudinal slits 19 into which are fitted end-portions of the links 6, 7 and 8, which are connected to pivots 20 which extend through said slits 19. The extensible frame D is made up of two sets of crossed slats or bars which are connected by pivots at the points of crossing, and it preferably consists of the diagonal bars 21, 22, and 23, which at their centers are connected by pivots 27 to the diagonal bars 24, 25 and 26; the bars 28 and 29 which are connected to each other by the pivot 30, and which are connected by the pivots 31 and 32 to the bars 25 and 22; the bars 33 and 34 which are connected to each other by the pivot 35 and which are connected by pivots 36 and 37 to the bars 22 and 25; the bar 38 which is connected to the bars 23 and 34 by the pivots 39 and 40; and the bar 41 which is connected by the pivots 42 and 43 to the bars 26 and 33. The bars 21 and 26 are connected to each other by the pivot 44, and the bars 23 and 24 are connected to each other by the pivot 45. The bar 29 is connected by pivot $29^1$ to the bar 21; the bar 24 is connected by pivots $28^1$ and $22^1$ to the bars 28 and 22; the bar 25 is connected by pivots $21^1$ and $23^1$ to the bars 21 and 23; the bar 26 is connected by pivots $22^1$ and $34^1$ to the bars 22 and 34; and the bar 33 is connected by the pivot $33^1$ to the bar 23.

The links 6 and 8 are connected by the pivots 46 and 47 to the bars 24 and 21, and the link 7 is connected to the pivot 30. The upright end bar E is provided with longitudinal slits 48 into which are fitted end-portions of the links 9 and 10 which are connected to the pivots 49 which extend through the slits 48. The links 9 and 10 are also connected to the pivots 40 and 43.

The plate 50 on which is pivotally mounted the stud 51 formed with a ring or handle 52, is provided with openings 53 for screws whereby it can be secured to the jamb or post 54 of the doorway or passageway. When the frame D is in the extended condition, the ring 52 can be passed through the slot 55 of the plate 58 which is fastened by screws 57 at the upper end of the bar E. The gate can be locked by turning the ring 52 to dispose it at an angle to the slot 55.

The extensible frame D may be constructed of light wooden bars; and the links 6, 7, 8, 9 and 10 may be of strap-iron. The hinges on which the extension frame may be swung like a gate are preferably sheet-metal stampings. The slits or kerfs which receive the metal links are centrally located in the uprights C and E, so that the links will occupy an intermediate plane between the two sets of diagonal bars which form the extensible frame. Thus a very light, strong and cheap construction is provided.

From the foregoing description, the construction, operation and advantages of the improved gate will be readily understood, and it will be seen that it is well adapted to accomplish the objects of the invention. When the gate is unlocked from the post 54, it can be compacted by contracting the frame D and then turned on the hinges B, so that it is disposed against and parallel to the post 13 and thus it is practically unnoticeable as an obstruction in the doorway or passageway.

The foregoing detailed description has been given for clearness of understanding, and no unnecessary limitations should be understood therefrom—but the appended claims should be construed as broadly as permissible in view of the prior art.

What I regard as new and desire to secure by Letters Patent is:—

1. A gate comprising an upright bar adapted to be secured to a door post, a second upright bar provided with longitudinal slits, hinges connecting the second upright bar to the first-mentioned upright bar, an extensible frame, links extending into the slits of said second-named upright bar and pivotally connected thereat and to said extensible frame, an upright bar at the other end of the extensible frame and provided with longitudinal slits, and links extending into the last-mentioned slits and pivotally connected to said last-named upright bar and to said extensible frame.

2. A gate adapted to extend between door posts, comprising the combination of an upright bar fastened to one of the door posts, a second upright bar provided with longitudinal slits, hinges disposed on the upper and lower ends of the upright bars, each of said hinges having horizontal leaves connected by a vertical pivot, said leaves having vertical flanges secured to the bars, an extensible frame, links extending into said slits and pivotally connected to said second upright bar and to said extensible frame, an outer end upright bar provided with slits, links extending into the last-mentioned slits and pivotally connected to said outer end upright bar and to said extensible frame, and co-acting means on the outer end upright bar and the other door-post for locking the gate.

3. In a gate, the combination of a pair of upright bars, an extensible frame mounted on one of said bars, and hinges fitted on the upper and lower ends of said pair of bars, each hinge comprising a pair of horizontal leaves connected by a vertical pivot, said leaves having portions bearing against the ends of the bars and vertical flanges embracing the bars and secured thereto.

4. A swinging extension gate, comprising a fixed vertical bar, an adjacent swinging vertical bar, hinges embracing and secured to the ends of said bars, said hinges having vertical pivots, a lazy-tongs frame comprising two sets of slats which cross each other and are pivotally joined at the points of crossing, and links pivotally connected to the swinging bar and pivotally joined to members of the lazy-tongs frame.

5. A gate comprising an upright bar provided with longitudinal slits, an extensible frame, links extending into the slits of said upright bar and pivotally connected thereat and also pivotally connected to said extensible frame, an upright bar at the other end of the extensible frame provided with longitudinal slits, and links extending into the last-mentioned slits and pivotally connected to said last-named upright bar and to said extensible frame.

6. A gate comprising an upright bar provided with a longitudinal slit, a lazy-tongs frame comprising two sets of slats which cross each other and are pivotally joined at the points of crossing, and connections between one end of the lazy-tongs frame and said upright bar, including a short link having one end pivotally connected with the lazy-tongs frame and the other end entered in said slit and pivotally joined to said upright bar.

7. A swinging extension gate, comprising a fixed vertical bar, an adjacent swinging vertical bar, hinges embracing and secured to the ends of said bars, said hinges having vertical pivots, a lazy-tongs frame comprising two sets of slats which cross each other and are pivotally joined at the points of crossing, and connections between one end of the lazy-tongs frame and said swinging bar, including a short link having one end pivotally connected with the lazy-tongs frame and the other end pivotally connected with said swinging bar.

AXEL W. SWANSON.